United States Patent Office 3,600,392
Patented Aug. 17, 1971

3,600,392
1-(9,10 - DIHYDROTHIENO-[3,2-b][1]BENZO-THIEPIN-10-YL)-PIPERAZINE AND HOMO-PIPERAZINE DERIVATIVES
Armin Zust, Birsfelden, Basel-Land, and Walter Schindler, Riehen, Basel-Land, Switzerland, assignors to Geigy Chemical Corporation, Ardsley, N.Y.
No Drawing. Filed May 13, 1968, Ser. No. 728,815
Claims priority, application Switzerland, May 19, 1967, 7,089/67
Int. Cl. C07d 51/70
U.S. Cl. 260—268
7 Claims

ABSTRACT OF THE DISCLOSURE

The compounds are of the class of thiepin derivatives, more particularly benzo thieno thiepin derivatives substituted in 10-position by piperazinyl which may be substituted. The compounds are useful as central depressants, in particular sedatives and tranquilizers. An illustrative embodiment is 1-(9,10-dihydro thieno[3,2-b][1]benzo-thiepin-10-yl)-4-methyl piperazine.

---

The present invention concerns new thiepin derivatives, processes for the production thereof, pharmaceutical preparations which contain the new compounds, and their use in warm-blooded animals, particularly mammals. More particularly, the present invention relates to compounds of the general Formula I (I)
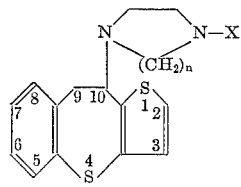

wherein $n$ is an integer of 2 or 3; and
X is hydrogen, lower alkyl, hydroxy(lower)alkyl, or alkanoyloxy(lower)alkyl having at most 10 carbon atoms as well as their acid addition salts with inorganic or organic acids.

Furthermore, the present invention relates to novel methods and compositions containing a compound of the above-mentioned formula for effecting central depressant, particularly sedative and tranquilizing activities in warm-blooded animals, especially mammals. More particularly, the method of effecting such pharmacological activities in mammals concerned with administering a compound as defined in the above-described formula in therapeutic doses.

According to this invention the scope of the substituents as defined in the above-mentioned formula may be characterized as follows:

The term "lower alkyl" as used herein or in "hydroxy (lower)alkyl" and "alkanoyloxy(lower)alkyl" means straight or branched alkyl chains of the general formula $C_mH_{2m+1}$ wherein $m$ represents an integer of 4 or less. The term "lower alkyl" may be exemplified by methyl, ethyl, propyl, isopropyl, butyl, isobutyl or the sec. butyl group. In addition, X as hydroxy(lower)alkyl can be 2-hydroxyethyl, 3-hydroxypropyl or 2-methyl-3-hydroxypropyl.

The group "alkanoyloxy(lower)alkyl" may have up to 10 carbon atoms; it may be exemplified by 2-acetoxyethyl, 2 - propionyloxyethyl, 3-acetoxypropyl, 2-methyl-3-ace-toxy propyl, 3-propionyloxypropyl, 2-methyl-3-propionyloxy propyl, 2-pivaloyloxyethyl, 3-pivaloyloxypropyl, 2-methyl-3-pivaloyloxy propyl, 2-heptanoyloxyethyl or 3-heptanoyloxypropyl.

The compounds of general formula I are produced by reacting a reactive ester of 9,10-dihydro-thieno[3,2-b] benzo-thiepin-10-ol of Formula II

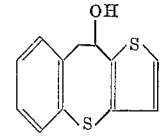

(II)

with a compound of general Formula III

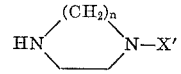

(III)

wherein $n$ has the meaning given in Formula I and X' has the meaning of X or it represents a group which can be replaced by hydrogen by hydrolysis or reductive cleavage, or by reacting such compound of Formula II with an alkali metal derivative of a compound of general Formula III; if necessary hydrolysing or reductively cleaving a product to convert the radical X' into the hydrogen atom, optionally treating a product the radical X of which is hydrogen with a lower alkylene oxide, a reactive monoester of a lower alkane diol or with a reactive ester of an alkanoyloxy alkanol having, at most, 10 carbon atoms, also optionally, acylating a product the radical X of which is a lower hydroxy(lower)alkyl group to form one the radical X of which is an alkanoyloxy(lower)alkyl group having, at most, 10 carbon atoms and, if desired, converting a compound obtained of general Formula I into an addition salt with an inorganic or organic acid.

The halides, particularly the chloride, are used as reactive esters of compounds of Formula II. Other such derivatives are the sulphonic acid esters, e.g. methane sulphonic acid ester and the toluene sulphonic acid esters.

The reaction of the starting materials, the reactive esters of the compound of Formula II, according to the invention is preferably performed in inert solvents, e.g. in hydrocarbons such as benzene, in low alkanols such as methanol or ethanol, in low alkanones such as acetone or methylethyl ketone, or also in water. The compound of general Formula III can be used in excess as acid binding agent, or a tertiary base such as triethylamine, is used as such. Optionally, the bases used can also serve as sole reaction medium. Depending on the constitution of the reaction components used, the reaction is more or less exothermic; it is completed, if necessary, by heating.

If, instead of a compound of general Formula III, an alkali metal derivative thereof is used for the reaction according to the invention, e.g. a sodium, potassium or lithium derivative, then the reaction is preferably performed in a hydrocarbon such as benzene or toluene.

If necessary, the subsequent conversion of the reaction product into a compound of general Formula I, in which conversion the radical X' is replaced by hydrogen, can be performed by hydrolysis or reductive cleavage depending on the type of the group X'.

Radicals which can be converted by hydrolysis into the hydrogen atom are acyl radicals, e.g. lower alkanoyl groups such as the acetyl group, arylcarbonyl groups such as the benzoyl group, radicals of monofunctional derivatives or carbonic or thiocarbonic acid such as the methoxycarbonyl, ethoxycarbonyl, phenoxycarbonyl or the benzyloxycarbonyl group or the corresponding thiocarbonyl groups. The hydrolysis is performed with the aid of an alkali metal hydroxide, e.g. potassium or sodium hydroxide, at a raised temperature, either in a higher boiling organic solvent containing hydroxy groups such as ethylene glycol or diethylene glycol, or in a lower monoalkyl ether of such as glycol, also in a lower alkanol. If a lower alkanol is used, then the reaction is preferably performed in a closed vessel. The hydrolysis can also be performed, e.g. by boiling with alkanolic hydrochloric acid.

Groups X' which can be converted into the hydrogen atom by reductive cleavage are, e.g. arylmethyl groups such as the benzyl group, diarylmethyl groups such as the diphenylmethyl group, or arylmethoxycarbonyl groups such as the benzyloxycarbonyl group. The reductive cleavage can be performed with hydrogen in an inert solvent in the presence of a sulphidised noble metal catalyst on a suitable carrier, e.g. in a lower alkanol such as methanol or ethanol in the presence of sulphidised palladium or platinum or platinum on charcoal.

Hydroxy(lower)alkyl or alkanoyloxy(lower)alkyl groups are introduced into the free imino group of compounds of general Formula I wherein the radical X is hydrogen by treating these 1-piperazinyl or hexahydro-1H-1,4-diazepin-1-yl compounds with, e.g. ethylene oxide, propylene oxide, 2-bromoethanol, 2-(p-tolylsulphonyloxy)-ethanol or (2-bromoethyl)-acetate. The reaction is preferably performed in a solvent to which—if the reaction proceeds with splitting off of 1 mol equivalent of acid—an acid binding agent is added. Suitable solvents are, e.g. hydrocarbons such as benzene or toluene, low alkanones such as acetone or methylethyl ketone and suitable acid binding agents are alkali carbonates such as potassium carbonate.

The hydroxy group of compounds of general Formula I wherein the radical X represents a hydroxy(lower)alkyl group can be acylated by heating such compounds, e.g. in the anhydride of a lower alkanoic acid such as acetic acid, propionic acid, butyric acid, pivalic acid or enanthic acid. Also, instead of the anhydrides, the corresponding carboxylic acid halides can be used for this acylation such as chlorides or bromides. These are used advantageously in the presence of an acid binding agent as which, e.g. tertiary bases such as triethylamine, are suitable. Instead of hydroxy(lower)alkyl compounds of general Formula I mentioned, also alkali metal derivatives of such compounds, e.g. sodium derivatives, can be reacted with corresponding acid halides.

The 10-chloro - 9,10 - dihydro-thieno[3,2-b][1]benzothiepin used as reactive ester of the compound of Formula II is produced e.g. starting from o-mercaptobenzoic acid. The dipotassium salt thereof is reacted with 3-bromothiophene to form o-(3-thienylthio)-benzoic acid. This free carboxylic acid is esterified with ethanol in the presence of concentrated sulphuric acid in toluene to form the ethyl ester and the ester obtained is reduced in tetrahydrofuran with diborane to form o-(3-thienyl-thio)-benzyl alcohol. This alcohol is converted with phosphorus tribromide in benzene into (o-bromomethylphenyl)-3-thienyl sulphide which, with sodium cyanide in ethanol and water, yields o(-3-thienylthio)-phenyl acetonitrile. The nitrile obtained is saponified with potassium hydroxide in ethanol and water to form o-(3-thienylthio)-phenyl acetic acid and the free carboxylic acid obtained is converted with thionyl chloride in benzene into the carboxylic acid chloride which is converted according to Friedel-Crafts in the same step into thieno[3,2-b][1]benzothiepin-10(9H)-one with the aid of Sn-tetrachloride in carbon disulphide while closing the ring. The ketone obtained is reduced with sodium borohydride in methanol and water to form 9,10-dihydro-thieno[3,2-b][1]benzothiepin-10-ol of Formula II and then this alcohol is reacted with thionyl chloride in pyridine and benzene whereby the hydroxy group in 10-position is replaced by the chlorine atom and sulphur dioxide and hydrogen chloride are split off. The o-(3-thienylthio)-phenylacetic acid mentioned above can also be produced by reaction of the dipotassium salt of o-mercapto-phenyl-acetic acid with 3-bromothiophene. o-Mercapto-phenyl-acetic acid is known and can be produced, e.g. starting from o-amino-phenylacetic acid by diazotisation, reaction with potassium ethyl xanthate and hydrolysis with sodium hydroxide solution.

Other reactive esters of the compound of Formula II can be produced analogously; as examples are mentioned: 10-bromo - 9,10 - dihydro - thieno[3,2-b][1]benzothiepin, methane sulphonic acid-, o- and p-toluene sulphonic acid-(9,10) - dihydro - thieno[3,2 - b][1]benzothiopin - 10 - yl ester).

If desired, the compounds of general Formula I obtained according to the processes of the invention are then converted into their addition salts in the usual way with inorganic and organic acids. For example, the acid desired as salt component or a solution thereof is added to a solution of a compound of general Formula I in an organic solvent. Preferably, organic solvents are chosen for the reaction in which the salt formed dissolves only with difficulty so that it can be isolated by filtration. Such solvents are e.g. methanol, acetone, methylethyl ketone, acetone/ethanol, methanol/ether or ethanol/ether.

Instead of free bases, pharmaceutically acceptable acid addition salts can be used in form of compositions, i.e. salts with those acids the anions of which are non-toxic in the usual dosages. In addition, it is advantageous if the salts to be used in form of compositions crystallise well and are not or are only slightly hygroscopic. For example, hydrochloric acid, hydrobromic acid, sulphuric acid, phosphoric acid, methane sulphonic acid, ethane sulphonic acid, β-hydroxyethane sulphonic acid, acetic acid, malic acid, tartaric acid, citric acid, lactic acid, oxalic acid, succinic acid, fumaric acid, maleic acid, benzoic acid, salicylic acid, phenylacetic acid, mandelic acid and embonic acid can be used for salt formation with compounds of general Formula I.

As pointed out above, the compounds of the present invention, i.e. compounds of the above-described general formula and their physiologically tolerable and pharmacologically acceptable acid addition salts possess valuable pharmacological and therapeutic properties and may be used in the form of pharmaceutical compositions, particularly as sedatives and tranquilizers. The instantly claimed compounds possess very strong central depressant activities in animals, as can be shown in pharmacological tests. The test substances decrease the locomotor activity and potentiate general anaesthetics. Furthermore, the compounds show strong anticonvulsant activity in the electroshock test in rats and show pronounced central and peripheral sympathicolytic effects. Accordingly, the new compounds are particularly suitable for the treatment of various kinds of anxiety, tension and excitement which are symptoms of many mental disorders, e.g. neurosis, depressions or schizophrenia. The new compounds can also be combined with other psychotropic agents as anti-depressants and strong neuroleptics. The toxicity of the compounds of the instant invention is low: for instance, the $LD_{50}$ of 1-(9,10-dihydrothieno[3,2-b][1]benzothiepin-10-yl)-4-methyl piperazine administered orally to mice is about 300 mg./kg.; the $LD_{50}$ of 4-(9,10-dihydro-thieno[3,2-b][1]benzothiepin - 10 - yl)piperazine - 1 - ethanol monofumarate in mice is higher than 800 mg./kg. p.o.; the $LD_{50}$ of 1-(9,10-dihydro-thieno[3,2-b][1]benzothiepin-10-yl)-4-methyl hexahydro-1H-1,4-diazepine dihydrochloride is higher than 100 mg./kg. i.p. in mice.

The compounds possess a general quietening effect on animals that can be seen in the motility test and in the potentiation of a short-acting anaesthetic; this effect is further substantiated by the adrenolytic effect on the isolated seminal vesicle. The latter test being correlated with a decrease in activity in the intact animal. The tests are performed as described in greater detail in the following paragraphs.

According to the test described by C. Morpurge et al.; Psychopharmacologia 6, 178–191 (1964), the dosage of which a decrease of 50% of motility over the control group is determined (expressed as DE₅₀) on administration of the following compounds:

| Compound administered | $DE_{50}$, mg./kg. | Test animals |
| --- | --- | --- |
| 1-(9,10-dihydro-thieno[3,2-b] [1]benzothiepin-10-yl)-4-methyl piperazine. | 25 p.o. | Mice. |
| 4-(9,10-dihydro-thieno[3,2-b,[1]benzothiepin-10-yl)piperazine-1-ethanol monofumarate. | 25 p.o. | Do. |
| 1-(9,10-dihydro-thieno[3,2-b][1]benzothiepin-10-yl)-4-methyl hexahydro-1H-1,4-diazepine dihydrochloride. | 5 i.p. | Do. |

According to a method described by W. Theobald et al.: Arch. int. Pharmacodyn.: 148, 560–596 (1964) and W. Theobald et al.: Arzneimittelforschung 9, 285–286 (1959) the extent to which an anaesthesia induced by a standard amount of the anaesthetic, 4-alkyl-2-methoxy phenoxy acetic acid diethyl amide is prolonged by a known dose of test compound, is determined. The change in the duration of the anaesthetic effect can be calculated in percent of the effect observed with a control group; the results are given below.

| Compound tested | Dosage, mg./kg. | Test animals | Percent increase in sleeping time |
| --- | --- | --- | --- |
| 1-(9,10-dihydro-thieno[3,2-b] [1]benzothiepin-10-yl)-4-methyl piperazine. | 50 p.o. | Mice | >+567 |
| | 200 p.o. | do | >+522 |
| 4-(9,10-dihydro-thieno[3,2-b] [1]benzothiepin-10-yl)piperazine-1-ethanol monofumarate. | 50 p.o. | Mice | >+250 |
| | 200 p.o. | do | >+522 |
| 1-(9,10-dihydro-thieno[3,2-b] [1]benzothiepin-10-yl)-4-methyl hexahydro-1H-1,4-diazepine dihydrochloride. | 50 p.o. | Mice | >+200 |
| | 200 p.o. | do | >+500 |

The adrenolytic activity of compounds can be determined according to a method described by J. Brügger: Helv. Physiol. Acta 3, 117–134 (1945) and F. Gross et al.: Schweiz. med. Wschr. 81, 352–357 (1951). In this test is determined the amount of a compound necessary to present by 50 to 80% the extent of contraction of the seminal vesicle of the mature male guinea pigs induced by a standard amount of adrenaline bitartrate. The amount of test compound necessary having the same contraction inhibiting effect as 1γ regitin is given in the following table (1γ regitin equals 1). Illustratively the following compound tested:

| Compound administered | Test animal | Adrenolytic value |
| --- | --- | --- |
| 1-(9,10-dihydro-thieno[3,2-b] [1]benzothiepin-10-yl)-4-methyl piperazine. | Guinea pig | >0.01 |

The compounds of the present invention may be used in warm-blooded animals, particularly mammals, in form of pharmaceutical compositions containing the compounds in admixture or conjunction with a pharmaceutical organic or inorganic solid or liquid carrier for oral, rectal or parenteral administration. The total daily doses for mammals vary from about 0.1 mg./kg. to about 200 mg./kg., preferably about 0.5 mg./kg. to about 150 mg./kg. depending on the mammal and condition. The preferred route of administration is the oral route. Suitable compositions include, without limitation, tablets, capsules, powders, solution, suspensions, sustained release formulations and the like.

Suitable dosage units such as dragees (sugar-coated tablets), tablets, suppositories or ampoules, preferably contain 5 mg. to 50 mg. of an active substance according to the invention or of a pharmaceutically acceptable salt thereof.

Dosage units for oral administration preferably contain between 1–90% of a compound of general Formula I or of a pharmaceutically acceptable salt thereof as active substance. They are produced by combining the active substance, e.g. with solid, pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium or calcium stearate or polyethylene glycols, to form tablets or dragee cores. The latter are coated, e.g. with concentrated sugar solutions which can also contain, e.g. gum arabic, talcum and/or titanium dioxide, or with a lacquer dissolved in easily volatile organic solvents or mixtures or solvents. Dyestuffs can be added to these coatings, e.g. to distinguish between varying dosages of active substance.

Other suitable dosage units for oral administration are hard gelatine capsules and also soft closed capsules made of gelatine and a softener such as glycerin. The hard gelatine capsules preferably contain the active substance as a granulate, e.g. in admixture with fillers such as maize starch, and/or lubricants such as talcum or magnesium stearate and, optionally, stabilisers such as sodium metabisulphite ($Na_2S_2O_5$) or ascorbic acid. In soft capsules, the active substance is preferably dissolved or suspended in suitable liquids such as liquid polyethylene glycols, to which stabilisers can also be added.

Examples of dosage units for rectal administration are suppositories which consist of a combination of an active substance or a suitable salt thereof with a fatty foundation, or also gelatine rectal capsules which contain a combination of the active substance or a suitable salt thereof with polyethylene glycols.

Ampoules for parenteral, particularly intramuscular, administration preferably contain a water soluble salt of an active substance in a concentration of, preferably, 0.5–5%, in aqueous solution, optionally together with suitable stabilisers and buffer substances.

The following prescriptions further illustrate the production of tablets and dragees:

(a) 250 g. of 1-(9,10-dihydro-thieno[3,2-b]benzothiepin - 10 - yl)-4-methyl-piperazine dihydrochloride are mixed with 175.80 g. of lactose and 169.70 g. of potato starch. The mixture is moistened with an alcoholic solution of 10 g. of stearic acid and granulated through a sieve. After drying, 160 g. of potato starch, 200 g. of talcum, 2.50 g. of magnesium stearate and 32 g. of colloidal silicum dioxide are mixed in and the mixture is pressed into 10,000 tablets, each weighing 100 mg. and containing 25 mg. of active substance. If desired, the tablets can be grooved for better adaptation of the dosage.

(b) A granulate is produced from 250 g. of 4-(9,10-dihydrothieno[3,2-b]benzothiepin - 10 - yl)-piperazine-1-ethanol dihydrochloride, 175.90 g. of lactose and the alcoholic solution of 10 g. of stearic acid. After drying, the granulate is mixed with 56.60 g. of colloidal silicum dioxide, 165 g. of talcum, 20 g. of potato starch and 2.50 g. of magnesium stearate and the mixture is pressed into 10,000 dragee cores. These are then coated with a concentrated syrup made from 502.28 g. of crystallised saccharose, 6 g. of shellac, 10 g. of gum arabic, 0.22 g. of dyestuff and 1.5 g.. of titanium dioxide, and dried. The dragees obtained each weigh 120 mg. and contain 25 mg. of active substance.

The following examples further illustrate the production of the new compounds of general Formula I and of hitherto undescribed intermediate products, but they do in no way restrict the scope of the invention. The temperatures are given in degrees centigrade.

EXAMPLE 1

(a) 8 g. (0.032 mol) of 10-chloro-9,10-dihydro-thieno-[3,2-b][1]benzothiepin are dissolved in 20 ml. of benzene. This solution is added dropwise at 20° to 10 g. of 1-methyl-piperazine in 20 ml. of benzene and the reaction mixture is refluxed for 3 hours. The mixture is then cooled to room temperature, 200 ml. of water and 5 ml. of concentrated sodium hydroxide solution are added and it is extracted with ether/methylene chloride (2:1). The organic phase is extracted with a molar citric acid solution, the acid extracts are made alkaline with concentrated sodium hydroxide solution and the free base is extracted with methylene chloride. The methylene chloride extract is washed with water, dried over magnesium sulphate and concentrated in vacuo. The residue is recrystallised from ethanol, whereupon pure 1-(9,10-dihydro-thieno[3,2-b][1]benzothiepin-10-yl) - 4 - methylpiperazine is obtained, M.P. 137–138°.

The starting material, 10-chloro-9,10-dihydro-thieno-[3,2-b][1]benzothiepin, is produced as follows:

(b) 77.0 g. (0.5 mol) of o-mercaptobenzoic acid are dissolved in 250 ml. of dimethyl formamide and, at 20–50°, the solution is added dropwise as quickly as possible to a suspension of 75.9 g. (0.55 mol) of potassium carbonate in 250 ml. of dimethyl formamide. On completion of the addition, the almost clear solution is heated to 100° and 81.8 g. (0.5 mol) of 3-bromothiophene [S. Gronowitz et al., Org. Synth. 44, 9–11 (1964)], 7.5 g. of copper powder and 0.5 g. of copper-(I)-oxide are added. The reaction mixture is heated to 140° and stirred at this temperature for 20 hours. After cooling to 100, 500 ml. of water and 5 ml. of concentrated sodium hydroxide solution are added and the warm solution is filtered over active charcoal and kieselguhr (Celite 545, registered trademark of Johns Manville International Corp.). The filter residue is well washed with hot water and the combined filtrates are extracted with ether. The aqueous phase is separated, heated with steam and acidified until it is acid to congo paper with hydrochloric acid while stirring. After cooling, the precipitated o(3-thienylthio)-benzoic acid is filtered off, washed with water and dried in vacuo at 70°, M.P. 184–186°.

(c) 236 g. (1.0 mol) of o-(3-thienylthio)-benzoic acid are dissolved in 1.5 litres of abs. tetrahydrofuran and while cooling with ice at 5–10°, the diborane freshly produced from 56.7 g. (1.5 mol) of sodium borohydride and 284 g. (2.0 mol) of borotrifluoride etherate in 700 ml. of diethylene glycol dimethyl ether, is bubbled in with nitrogen. On completion of the addition of the diborane, the reaction mixture is brought to room temperature within 1 hour and then slowly heated to reflux temperature. It is refluxed for 8 hours, cooled with ice and then 500 ml. of 1-molar sodium dihydrogen phosphate solution are carefully added. The tetrahydrofuran is substantially removed under vacuum and the residue is extracted with ether and water. The ethereal solution is extracted with 200 ml. of 2 N sodium hydroxide solution, washed neutral with water and dried over magnesium sulphate. After removal of the solvent, the oily residue obtained is distilled under high vacuum (about 0.01 torr) at 130–140°. The pure o-(3-thienylthio)benzyl alcohol melts at 35–38°.

(d) 430 g. (1.94 mol) of the alcohol obtained according to Example 1(c) are dissolved in 800 ml. of abs. benzene. 206 g. (0.80 mol) of phosphorus tribromide are added dropwise to this benzene solution at 5–10°, the addition being made within 30 minutes. The temperature of the reaction mixture is then allowed to rise to room temperature within 1 hour after which it is heated for 2 hours at 40°. The yellow-brown reaction mixture obtained is poured into 2 litres of ice water, the organic phase is separated, washed neutral with saturated sodium hydrogen carbonate solution and water and the washing liquids are extracted with methylene chloride.

The combined organic phases are dried over magnesium sulphate and concentrated in vacuo. The residue is crystallised from benzene/petroleum ether. The (o-bromomethylphenyl)-3-thienyl sulphide obtained melts at 57–59°.

(e) 510 g. (1.79 mol) of the bromide obtained according to Example 1(d) and 460 ml. of ethanol are added in portions simultaneously to a boiling solution of 253 g. (5.37 mol) of sodium cyanide in 240 ml. of water and 50 ml. of ethanol, the addition being so made that the temperature of the reaction mixture does not fall below boiling temperature. On completion of the addition, the mixture is refluxed for another 8–10 hours and then 300 ml. of ethanol are distilled off from the reaction mixture. 400 ml. of water and 900 ml. of ether are added to the distillation residue and the organic phase is separated. This is washed with water, dried over magnesium sulphate and evaporated in vacuo. The residue is distilled at 150–160° under high vacuum (0.01 torr) and yields pure o-(3-thienylthio)-phenyl acetonitrile, $n_D^{20}=1.6385$.

(f) 400 g. (1.73 mol) of the nitrile obtained according to Example 1(e) are added to a solution of 242 g. (4.3 mol) of potassium hydroxide in 123 ml. of water and 1.6 litres of ethanol. The mixture is refluxed for 22 hours until no more ammonia development can be determined after which 1.4 litres of ethanol are distilled off from the reaction mixture and the same volume of water is added. The solution is cooled to room temperature, extracted with ether, concentrated hydrochloric acid is added to the aqueous phase until it has a congo acid reaction and the crude product, which precipitates in crystalline form, is extracted with ether/methylene chloride (2:1). The extract is washed with water, dried over magnesium sulphate and concentrated in vacuo. The residue is recrystallised from benzene/petroleum ether. The pure o-(3-thienylthio)-phenylacetic acid obtained melts at 86–88°.

(f$^i$) The o-(3-thienylthio)-phenylacetic acid can also be obtained by condensation of o-mercapto-phenylacetic acid, M.P. 96–97° (Marschalk. Chem., Ber. 45, 1483 and J. Prakt. Chem. 88, 214; Beilstein 10, I/82) with 3-bromothiophene analogously to Example 1(b) by the following process:

280 g. (2.0 mol) of potassium carbonate are suspended in 700 ml. of dimethyl formamide and a solution of 310 g. (1.84 mol) of o-mercapto-phenylacetic acid in 700 ml. of dimethyl formamide is added dropwise as quickly as possible at 20–50°. On completion of the addition, the almost clear solution is heated to 100° and 25 g. of copper powder, 3 g. of copper oxide and 300 g. (1.84 mol) of 3-bromothiophene are added. The reaction mixture obtained is stirred for 20 hours at 140°. After cooling to 100°, 1 litre of water and 40 ml. of concentrated sodium hydroxide solution are added and the solution is filtered while still hot over active charcoal and Celite. The filter residue is thoroughly washed with hot water and the combined, cooled filtrates are extracted with ether. The aqueous phase is separated, heated with steam and again cooled. The cooled solution is made strongly acid with concentrated hydrochloric acid while stirring well whereupon the o-(3-thienylthio)-phenylacetic acid crystallises out. The product is filtered off, washed with water and dried in vacuo, M.P. 86–88°.

(g) 212 g. (0.85 mol) of the carboxylic acid obtained according to Example 1(f) or 1(f$^i$) are dissolved in 850 ml. of benzene. 121 g. (1.02 mol) of pure thionyl chloride are added dropwise to this solution at 40–50°, the addition being made within 30 minutes. A stream of dry nitrogen is passed through the benzene solution both during the dropwise addition and during the reaction. The reaction mixture is heated for 2 hours at 50–55° and then evaporated in vacuo. The oily residue is dissolved in 450 ml. of benzene and the solution obtained is added dropwise at 0–5° to a solution of 228 g. (0.85 mol) of stannium tetrachloride in 450 ml. of 1,1,2,2-tetrachloroethane. The reaction mixture is stirred for 12 hours at room temperature and then, while cooling with ice, a mixture of 48 ml. of concentrated hydrochloric acid and 400 ml. of water is so added dropwise that the temperature does not exceed 20°. To remove a slight suspension, the two-phase mixture is filtered over Celite and the filter residue is washed with methylene chloride.

The organic phase is removed and the aqueous phase is washed twice with methylene chloride. The combined organic phases are washed neutral with 2 N ammonia and water, dried over magnesium sulphate and concentrated in vacuo. Recrystallisation of the residue from benzene/ petroleum ether yields pure thieno[3,2-b][1]benzothiepin-10(9H)one, M.P. 133-140°.

(h) 116 g. (0.5 mol) of the ketone obtained according to Example 1(g) are dissolved in 1.5 litres of methanol. A solution of 42 g. (1.1 mol) of sodium borohydride in 300 ml. of water is added to this solution at reflux temperature within 1 hour.

The reaction mixture is refluxed for another 2 hours and then 800 ml. of methanol are distilled off from the reaction mixture. The distillation residue is poured into 2 litres of ice water and the pH is adjusted to 6 with concentrated hydrochloric acid and sodium dihydrogen phosphate. The precipitated crude product is filtered off, washed with water and dried in vacuo at 30°. After recrystallisation from ethanol/petroleum ether, the pure 9,10-dihydro-thieno[3,2-b][1]benzothiepin - 10 - ol melts at 116-117°.

(i) 60 g. (0.25 mol) of the alcohol obtained according to Example 1(h) are dissolved in 26.3 g. of pyridine (0.33 mol) and 240 ml. of benzene. A solution of 36.5 g. (0.31 mol) of distilled thionyl chloride in 120 ml. of benzene is added dropwise to this solution at 0-5°. The reaction mixture is then stirred for 4 hours at 45-50°, then 100 ml. of ether are added and the mixture is poured into 800 ml. of ice water. The organic phase is separated and is washed neutral first with 2 N hydrochloric acid, then with water, 2 N sodium hydrogen carbonate solution and finally with water. The organic phase is dried over magnesium sulphate and concentrated in vacuo. The residue is recrystallised from benzine/pentane whereupon 10-chloro-9,10-dihydro-thieno[3,2-b][1]benzothiepin melts at 93-94°.

EXAMPLE 2

The oily 4-(9,10 - dihydro - thieno[3,2-[b][1]benzothiepin-10-yl)piperazine-1-ethanol is obtained analogously to Example 1(a) starting from 10-chloro-9,10-dihydro-thieno[3,2-b][1]benzothiepin with piperazine-1-ethanol. It is converted into the monofumarate which melts at 196-198°.

EXAMPLE 3

Starting from 10-chloro-9,10-dihydro-thieno[3,2-b][1] benzothiepin, the oily 1-(9,10-dihydro-thieno[3,2-b][1] benzothiepin-10-yl)-4-methyl - hexahydro - 1H - 1,4-diazepine is obtained analogously to Example 1(a) with 1-methyl-hexahydro-1H-1,4-diazepine. It is converted into the dihydrochloride which melts at 182-183° (from ethanol/ether).

What is claimed is:
1. A compound of the formula

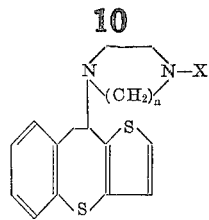

wherein

*n* is an integer of 2 or 3; and

X is hydrogen, lower alkyl, hydroxy(lower)alkyl or alkanoyl(lower)alkyl of at most 10 carbon atoms or a pharmaceutically acceptable acid addition salt thereof.

2. A compound as defined in claim 1 wherein said compound is 1-(9,10-dihydrothieno[3,2-b][1]benzothiepin-10-yl)-4-methyl piperazine.

3. A compound as defined in claim 1 wherein said compound is a pharmaceutically acceptable acid addition salt of 1-(9,10-dihydrothieno[3,2-b][1]benzothiepin-10-yl)-4-methyl piperazine.

4. A compound as defined in claim 1 wherein said compound is 4-(9,10-dihydro-thieno[3,2-b][1]benzothiepin-10-yl)-piperazine-1-ethanol.

5. A compound as defined in claim 1 wherein said compound is a pharmaceutically acceptable acid addition salt of 4-(9,10-dihydro-thieno[3,2-b][1]benzothiepin-10-yl)-piperazine-1-ethanol.

6. A compound as defined in claim 1 wherein said compound is 1-(9,10-dihydro-thieno[3,2-b][1]benzothiepin-10-yl)-4-methyl hexahydro-1H-1,4-diazepine.

7. A compound as defined in claim 1 wherein said compound is a pharmaceutically acceptable acid addition salt of 1-(9,10-dihydro-thieno[3,2-b][1]benzothiepin-10-yl)-4-methyl hexahydro-1H-1,4-diazepine.

References Cited

UNITED STATES PATENTS

| | | | |
|---|---|---|---|
| 3,474,099 | 10/1969 | Renz | 260—268 |
| 3,487,085 | 12/1969 | Protiva | 260—268 |
| 3,491,103 | 1/1970 | Jucker | 260—332.3 |

FOREIGN PATENTS

| | | | |
|---|---|---|---|
| 1,413,978 | 9/1965 | France | 260—327B |

DONALD G. DAUS, Primary Examiner

U.S. Cl. X.R.

260—239, 329, 332.2, 332.3, 332.5; 424—250, 275